United States Patent [19]

Nagaoka

[11] Patent Number: 5,705,069
[45] Date of Patent: Jan. 6, 1998

[54] CENTRIFUGAL WATER TREATMENT DEVICE

[75] Inventor: Tadayoshi Nagaoka, Tondabayashi, Japan

[73] Assignee: Harusuke Naito, Japan; a part interest

[21] Appl. No.: 506,841

[22] Filed: Aug. 2, 1995

[51] Int. Cl.$^6$ .................................................. C02F 1/38
[52] U.S. Cl. ........................ 210/369; 210/381; 210/497.3; 210/498; 210/223
[58] Field of Search .................................. 210/222, 223, 210/360.1, 360.2, 369, 380.1, 403, 497.01, 497.3, 498, 695, 781, 381; 209/221, 279, 393, 395

[56] References Cited

U.S. PATENT DOCUMENTS

| | | | |
|---|---|---|---|
| 4,883,591 | 11/1989 | Belasco | 210/223 |
| 5,255,790 | 10/1993 | Einoder et al. | 210/498 |

FOREIGN PATENT DOCUMENTS

| | | | |
|---|---|---|---|
| 17710 | 5/1972 | Japan | 210/360.2 |
| 2033242 | 5/1980 | United Kingdom | 210/380.1 |

*Primary Examiner*—Matthew O. Savage
*Attorney, Agent, or Firm*—Hedman, Gibson & Costigan, P.C.

[57] ABSTRACT

A water treatment device includes a casing having an outlet of treated water, a screen basket having a peripheral wall portion and a closed end portion and being received in the casing, a screen section provided in the peripheral wall portion of the screen basket, a drive unit for rotating the screen basket, and a water supply section provided in the screen basket and communicating with a source of water to be treated. The screen section of the screen basket includes support rods having a projecting portion in the radially inner end portion thereof and wires of a substantially triangular cross section provided radially inwardly of the support rods and extending in a direction crossing with the support rods, each of the wires being arranged with its one side facing inward and two other sides forming a slit which widens radially outwardly between adjacent wires and with an apex of each wire being welded to the projecting portion of the support rods at crossing points of the wire and the support rods. The width of the slit of the wires is 1 μm or over and less than 100 μm.

2 Claims, 9 Drawing Sheets

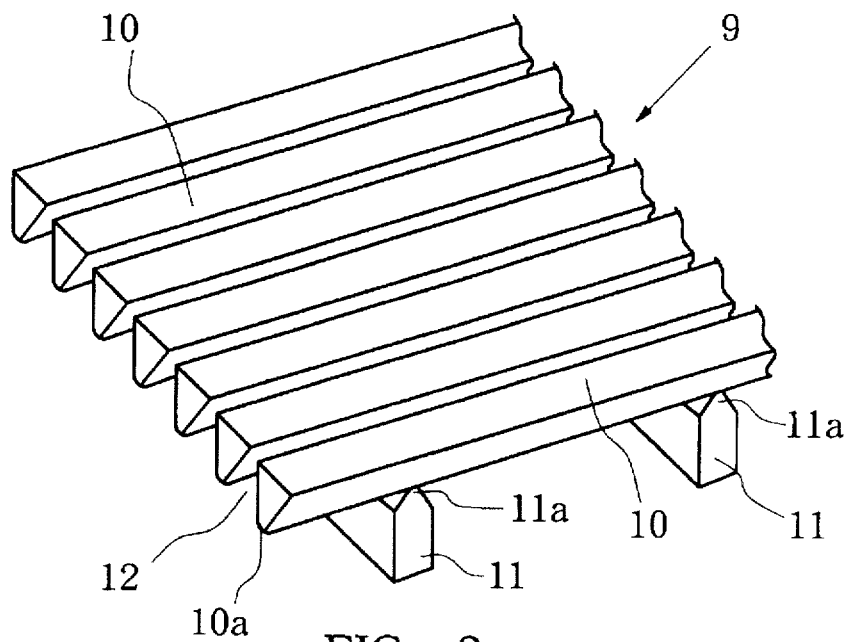
FIG. 3
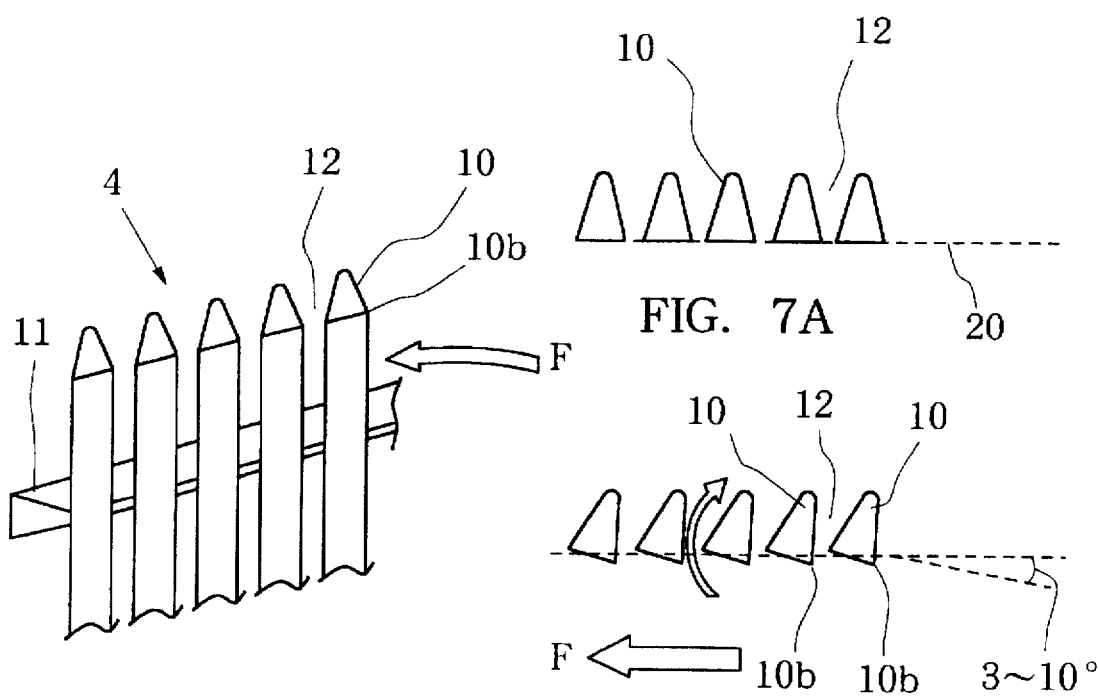
FIG. 7B
FIG. 7A
FIG. 7C

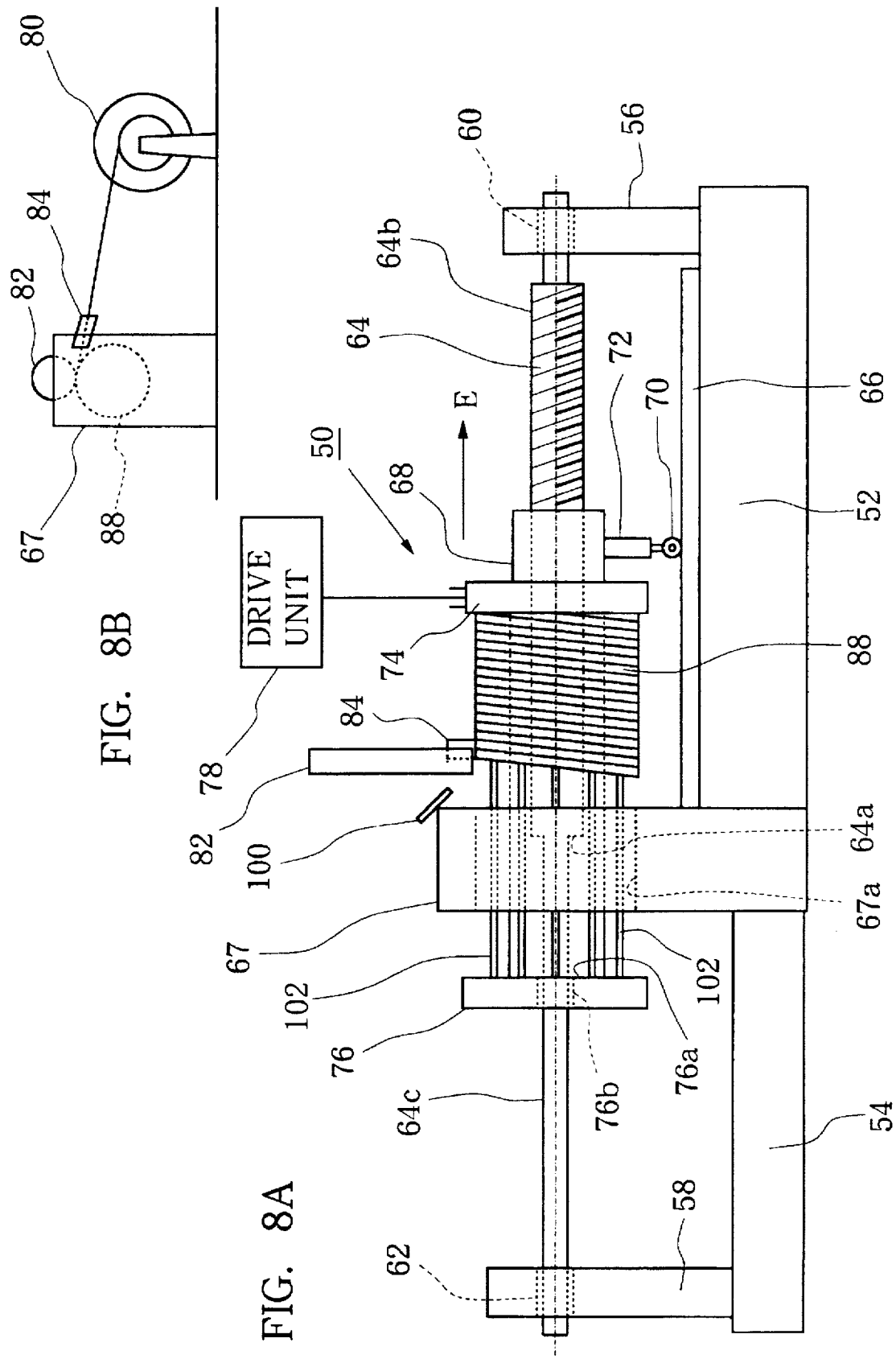

CENTRIFUGAL WATER TREATMENT DEVICE

BACKGROUND OF THE INVENTION

This invention relates to a water treatment device and, more particularly, to a centrifugal water treatment device capable of improving quality of water by filtering of water and also by fractionization of particles of water.

It is known in the art that various useful results can be obtained by activation of water by subjecting water to a magnetic processing and various devices for the magnetic processing of water have been developed. For example, the specification of Japanese Utility Model Registration No. 3003275 discloses a water treatment device which includes a cylindrical housing having a water inlet at one end and a water outlet at the other end and containing a filter tank in which granular active carbon, sand etc. are piled one layer upon another. In the filter tank is also provided a layer of granular ceramic and at least one magnet is disposed on the upper and/or lower layer of the granular ceramic in such a manner that the direction of lines of magnetic force coincides with each other and is in parallel to the direction of flow of water thereby to purify and activate water particles.

In treating water by such a magnetic processing device, it is known that water to be treated should preferably contain as little impurities as possible and that particles of water to be treated should preferably be fractionized to the maximum extent possible.

As a prior art device available for pretreatment of water is a filter device using a filtering cloth as an element for separating solids from liquid. This prior art filter device however has the disadvantage that meshes of the filter cloth tend to be blocked by solids in a short period of time resulting in loss of filtering capacity. Moreover, it is not possible by this filter device to obtain the function of fractionization of water particles.

It is, therefore, an object of the present invention to provide a water treatment device capable of fractionizing water particles as well as filtering off impurities in water to be treated.

SUMMARY OF THE INVENTION

A water treatment device achieving the above described object of the invention comprises a casing having an outlet of treated water, a screen basket having a peripheral wall portion and a closed end portion and being received in the casing, a screen section provided in the peripheral wall portion of the screen basket, a drive unit for rotating the screen basket, and a water supply section provided in the screen basket and communicating with a source of water to be treated, said screen section of the screen basket comprising support rods having a projecting portion in the radially inner end portion thereof and wires of a substantially triangular cross section provided radially inwardly of the support rods and extending in a direction crossing with the support rods, each of the wires being arranged with its one side facing inward and two other sides forming a slit which widens radially outwardly between adjacent wires and with an apex of each wire being welded to the projecting portion of the support rods at crossing points of the wire and the support rods, and the width of said slit of the wires being at 1 μm or over and less than 100 μm.

According to the invention, by setting the width of the slit of the wires at 1 m or over and less than 100 m which is a much lower value than the slit width of a wedge wire screen employed in the past in filtering devices including centrifugal dehydrators, water to be treated which passes through the slit of this extremely small value has its particles divided into smaller particles and thereby is activated. Therefore, the water treated in the device according to the invention is converted to activated water which is useful for a desired purpose.

Since the device according to the invention can fractionize particles of water to be treated and also filter off fine impurities of in the water to be treated, the device is suitable for pretreating water to be treated before subjecting it to magnetic processing. Further, the device according to the invention is useful not only as such pretreatment device but can be used by itself for activating water and thereby obtaining the known advantageous results such as purification of water and prevention of deterioration of the quality of water.

The device according to the invention is applicable to a wide range of uses including activation and purification of drinking water, factory water, water in swimming pools and sewage, water stored in a pond in a public park and a water reservoir and a dam.

In one side of the invention, the screen basket is disposed with its axis extending in the vertical direction and in the frust-conical shape with its diameter increasing upwardly.

According to this aspect of the invention, solids contained in water to be treated is carried upwardly along the inclined surface of the screen basket and removed easily to the outside from the upper edge portion of the screen basket.

In another aspect of the invention, the screen section is arranged in such a manner that the slit is inclined by 30 to 42 degrees with respect to a plane perpendicular to the axis of the screen basket.

According to this aspect of the invention, resistance of the screen section to the water stream is made minimal and rotation of the screen basket at the highest speed is attained with the result that water collides against the inner wall of the casing and fractionization of particles of water thereby is enhanced.

In another aspect of the invention, the device further comprises blades in the form of plates secured fixedly to the inside surface of the screen section, said blades being inclined by 30 to 42 degrees with respect to a plane perpendicular to the axis of the screen basket.

According to this aspect of the invention, the centrifugal force acting on the water stream is increased while resistance of the screen section to the water stream is held minimum whereby the speed of water passing through the slit is increased.

In another aspect of the invention, the screen section is arranged in such a manner that the slit an inclination angle of 30 to 42 degrees crosses with respect to a plane perpendicular to the axis of the screen basket.

According to this aspect of the invention, resistance of the slit to the water stream is made maximum and, as a result, water to be treated is forced out of the slit whereby separation of water from the screen basket is enhanced.

In another aspect of the invention the screen section is arranged in such a manner that the slit extends from one end to the other end of the peripheral wall portion and a projecting portion on the upstream side of each of the wires projects in a stream of water by 3 to 10 degrees from a plane on which the inside surfaces of the wires are aligned.

According to this aspect of the invention, resistance of the slit to the water stream is increased and separation of water from the screen basket is thereby enhanced.

In another aspect of the invention, the screen section is made at least partly of a magnetic substance.

According to this aspect of the invention, a metal particle having a diameter which is smaller than the slit width is caught by the screen section and thereby is removed from water to be treated.

In another aspect of the invention, the distance between the screen section and the inner wall of the casing is determined in such a manner that water let out of the slit collides against the inner wall of the casing with a predetermined force.

According to this aspect of the invention, fractionization of particles of water is further enhanced.

In another aspect of the invention, the direction of rotation of the screen basket coincides with the direction of the rotation of the earth on its axis (i.e., counterclockwise in the northern hemisphere and clockwise in the southern hemisphere).

According to this aspect of the invention, water to be treated is activated and water particles are fractionized by rotating the screen basket in the same direction as the rotation of the earth on its axis in the magnetic field of the earth.

In still another aspect of the invention, there is provided a water treatment system comprising the water treatment device as defined in claim 1 and a magnetic processing device connected to the outlet of treated water in the casing of the water treatment device.

BRIEF DESCRIPTION OF THE DRAWINGS

In the accompanying drawings,

FIG. 3 is an enlarged partial perspective view of a screen plate;

FIGS. 7A, 7B and 7C are views showing a part of the screen section in detail;

FIG. 8A and 8B are views showing a device for manufacturing the screen plate;

DESCRIPTION OF PREFERRED EMBODIMENTS

An embodiment of the invention will be described below with reference to the accompanying drawings.

Figure 1:
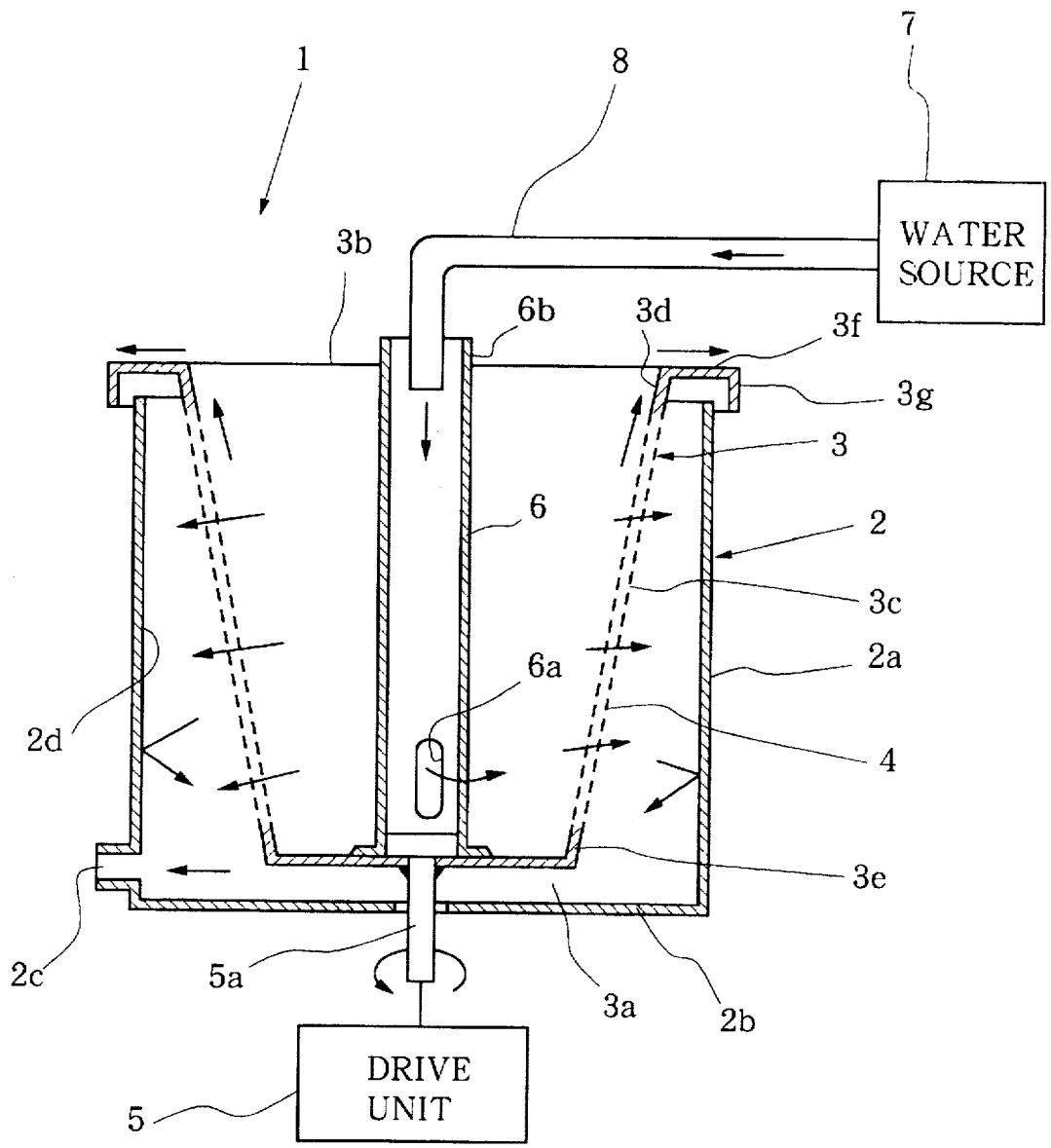
FIG. 1 is a vertical sectional view schematically showing an embodiment of the water treatment device according to the invention.

FIG. 1 is a vertical section showing schematically an embodiment of a centrifugal water treatment device according to the invention.

A centrifugal water treatment device 1 is of a vertical type and includes a casing 2 which has a cylindrical peripheral wall portion 2a and a closed bottom portion 2b. An outlet 2c for letting out treated water is formed in the lower portion of the peripheral wall portion 2a of this casing 2.

A screen basket 3 is housed in the casing 2. This screen basket 3 is disposed with its axis extending in the vertical direction and has a frust-conical shape with its diameter increasing upwardly. The bottom portion 3a of the screen basket 3 is closed and its top portion 3b is open. A peripheral wall portion 3c of the screen basket 3 has solid upper and lower sections 3d and 3e. At the upper end of the upper end portion 3d is integrally formed a radially outwardly extending flat annular upper peripheral section 3f. The outer edge portion of the upper peripheral section 3f bent downwardly to form a perpendicular section 3g.

A screen section 4 made of wedge wires to be described later is provided between the upper end portion 3d and the lower end portion 3e of the screen basket 3.

A rotary shaft 5a of a drive unit 5, known per se, including an electric motor and a reduction gear is welded at the upper end thereof to the bottom portion 3a of the screen basket 3. By actuating the drive unit 5, the screen basket 3 is rotated about its axis. It is preferable that the direction of rotation of the screen basket 3 should coincide with the rotation of the earth on its axis. In the example of FIG. 1 in which the device is assumed to be used in the northern hemisphere, the screen basket 3 is rotated counterclockwise.

In the central portion of the bottom portion 3a of the screen basket 3 is welded a vertically erected cylindrical water supply section 6. A supply outlet 6a for supplying water to be treated into the screen basket 3 is formed in the lower portion of the water supply section 6. The upper end portion of the water supply section 6 is opened and the water supply section 6 communicates with a water source 7 of water to be treated through a conduit 8 which is inserted at its end portion in the open end portion 6b of the water supply section 6 with a gap being formed between the outer periphery of the conduit 8 and the inner surface of end portion 6a.

The distance between the screen section 4 and the inner wall of the casing 2 is determined in such a manner that water let out of a slit of the screen section 4 collides against the inner wall of the casing 2 with a predetermined force and fractionization of particles of water thereby is enhanced.

Figure 2:
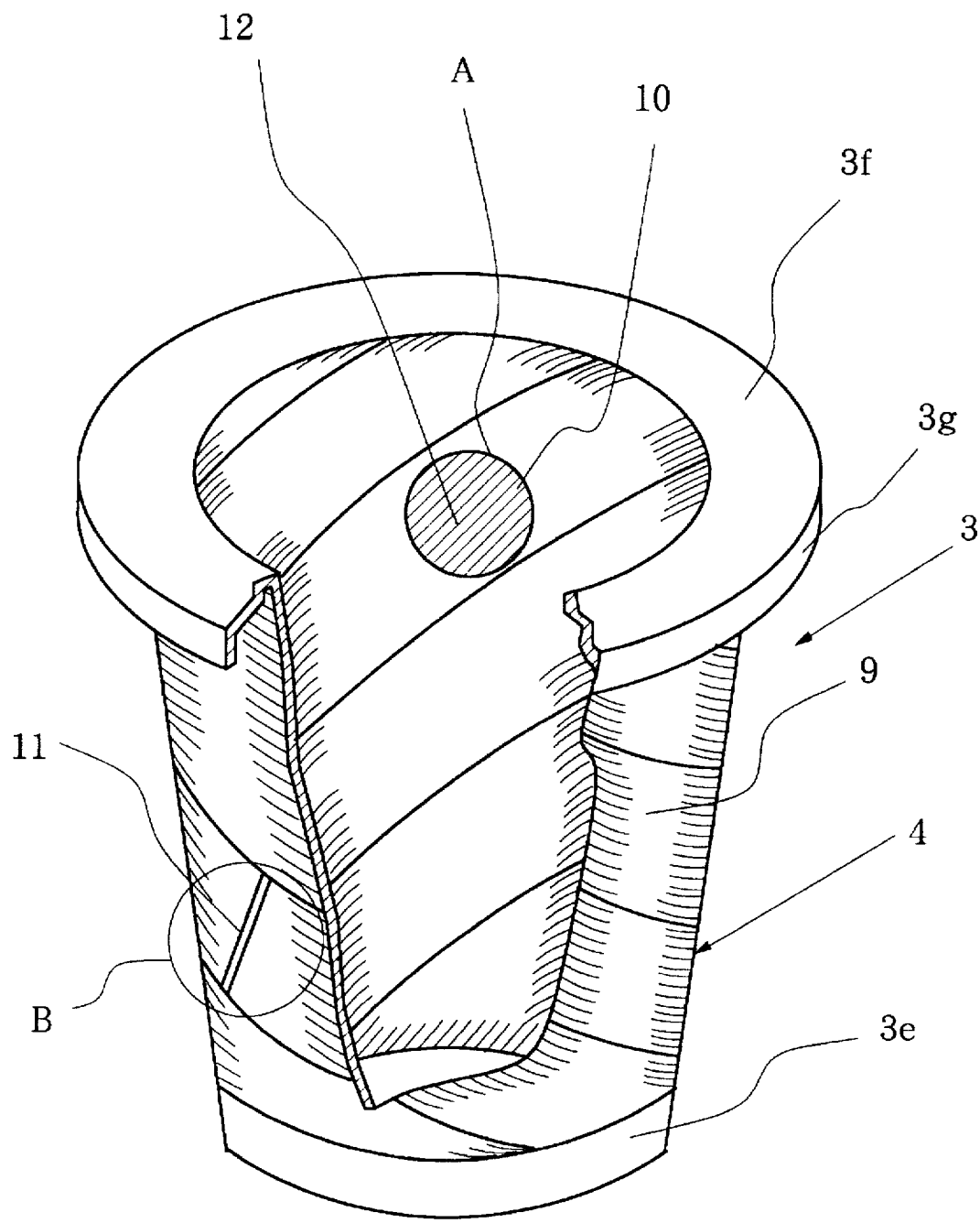
FIG. 2 is a perspective view, partly cut away, showing an example of a screen basket.
Figure 4:
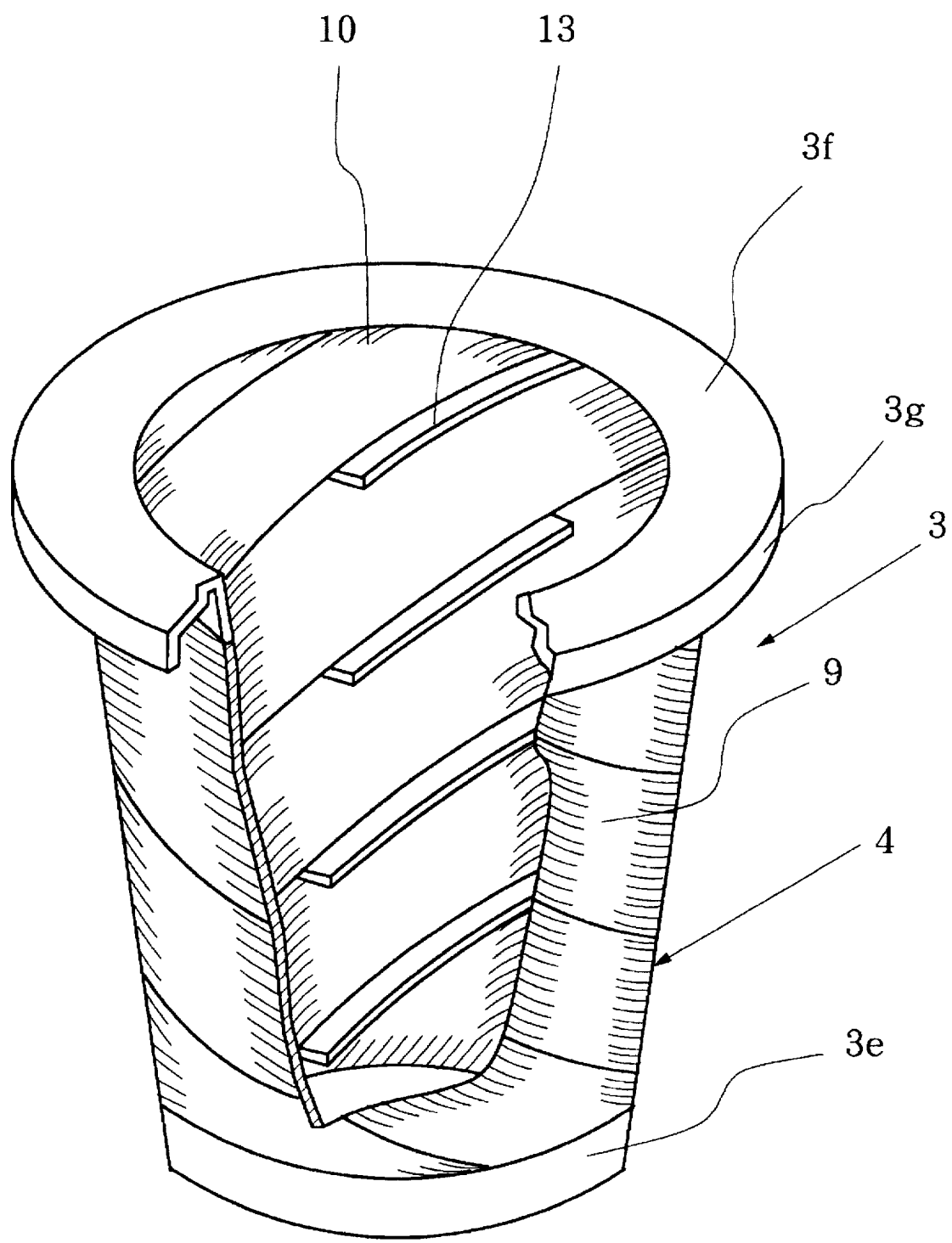
FIG. 4 is a perspective view, partly cut away, of another example of a screen basket.
Figure 5:
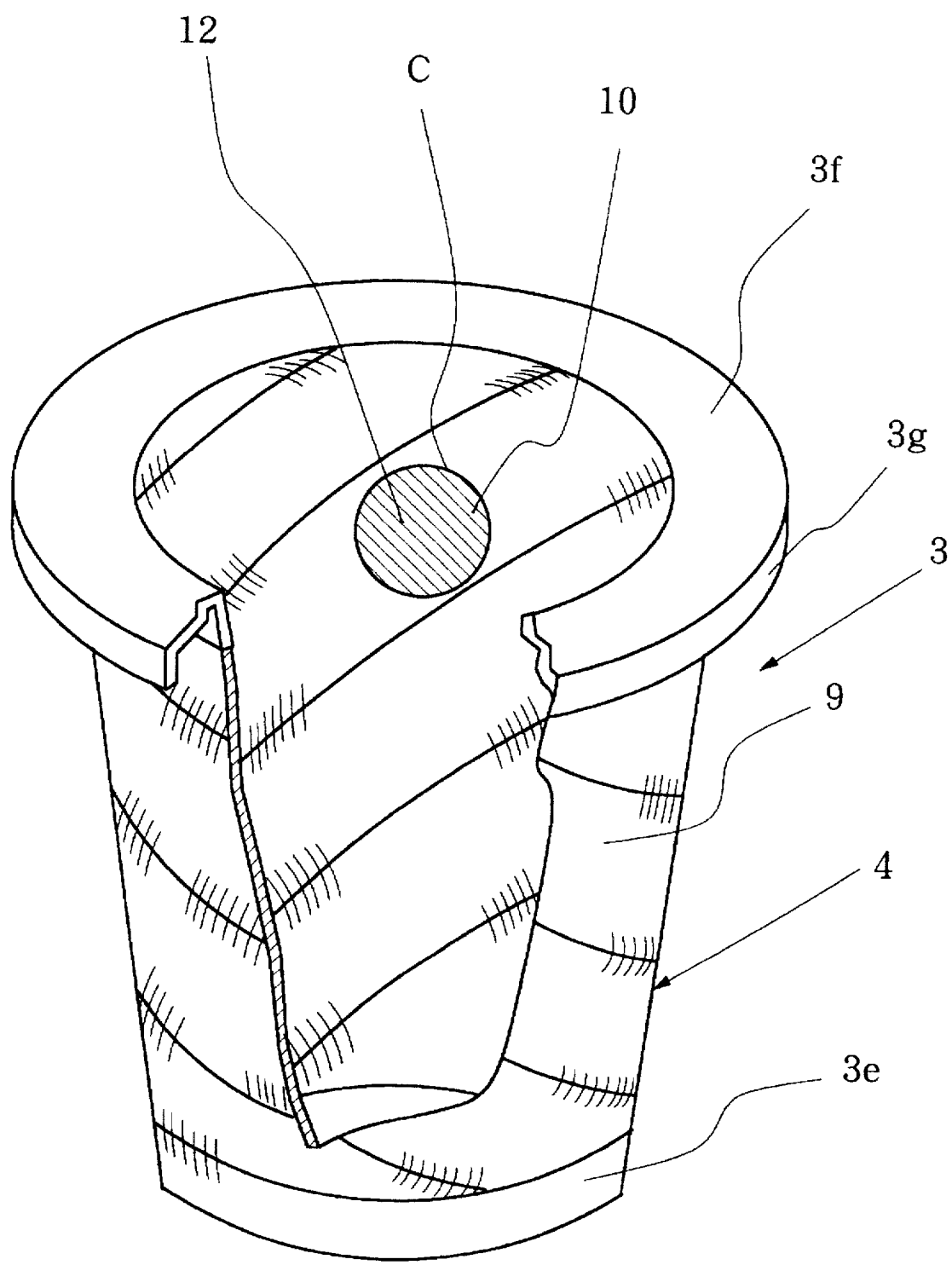
FIG. 5 is a perspective view, partly cut away, of another example of a screen basket.
Figure 6:
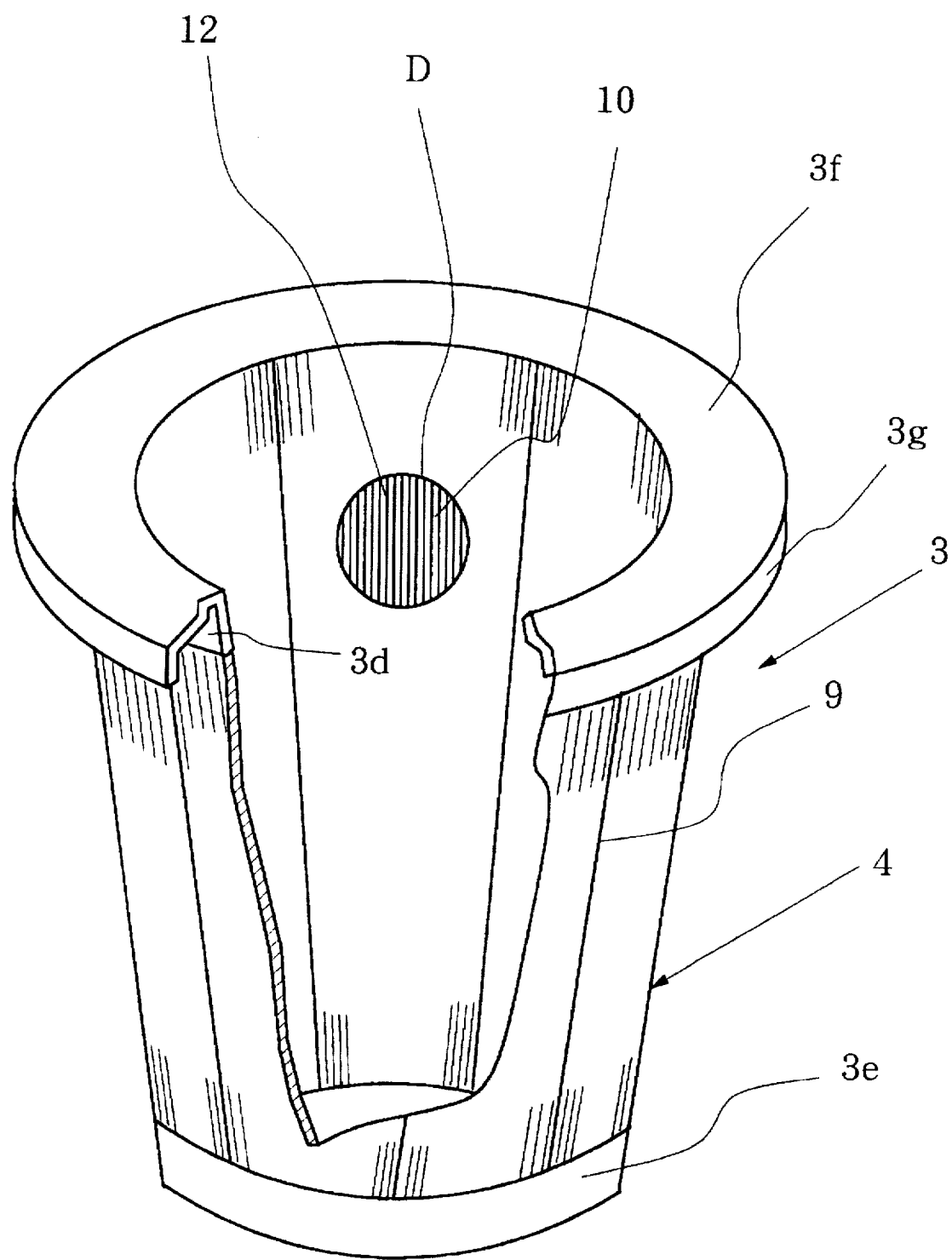
FIG. 6 is a perspective view, partly cut away, of another example of a screen basket.

A preferred example of the screen section 4 of the screen basket 3 is shown in FIG. 2. This screen section 4 is formed by connecting screen plates 9 vertically in such a manner that these screen plates 9 are inclined by a certain degree and side edges of each screen plate 9 are in contact with side edges of adjacent screen plates 9. As illustrated by circle A in the figure, each screen plate 9 is formed by arranging wedge wires 10 in the longitudinal direction of the screen plate 9. As shown in FIG. 3, each screen plate 9 includes support rods 11 having a projecting portion 11a and being arranged in parallel at a proper interval. Wedge wires 10 of a substantially triangular cross section are disposed radially inwardly of these support rods 11 in a direction crossing with the support rods 11. Each of the wedge wires 10 is arranged with its one side facing inward and two other sides forming a slit 12 which widens radially outwardly between adjacent wedge wires and with an apex 10a of each wedge wire being welded to the projecting portion 11a of the support rods 11 at crossing points of the wedge wire 10 and the support rods 11. In FIG. 2, the support rod 11 is illustrated in circle B only and illustration of the support rods 11 in other portion of the screen plate 9 is omitted. Likewise, illustration of the support rods 11 is omitted in FIGS. 4; 5 and 6. In FIGS. 4, 5 and 6, the arrangement of the support rods 11 and the wedge wires 10 is the same as that shown in FIG. 2.

In FIG. 2, the respective screen plates 9 are welded to adjacent screen plates 9 at sides of these screen plates 9. The screen section 4 is also welded at its upper and lower edges to the upper end portion 3d and the lower end portion 3e of the screen basket 3.

The width of the slit 12 is set at an extremely small value of 1 μm or over and less than 100 μm. For obtaining sufficiently finely fractionized water particles, the width of the slit 12 should preferably be within a range between 1 μm and 50 μm and most preferably within a range between 1 μm and 20 μm. The screen plate 9 having such a super fine slit can be obtained by first manufacturing a cylindrical screen by a screen cylinder manufacturing apparatus shown in FIGS. 8 to 10 and then cutting this cylindrical screen to a desired size and shaping the cut piece to a flat screen plate. A method of manufacturing such a cylindrical screen will be described below with reference to FIGS. 8 to 10.

A screen cylinder manufacturing apparatus 50 has a front bed 52 and a rear bed 54. A screw 64 is rotatably supported by bearings 60 and 62 which are mounted on support frames 56 and 58 provided on the front and rear beds 52 and 54. The screw 64 has a threaded front portion 64b of a large diameter, a central step portion 64a and an unthreaded rear portion 64c of a reduced diameter. Rails 66 are laid on the front bed 52 below the screw 64. A cylindrical screw cover 68 has a threaded inner periphery and is disposed coaxially with the screw 64 in threaded engagement with the screw 64. Wheels 70 are fixed to the front end portion of the screw cover 68 in such a manner that the wheels 70 can run along the rails 66. Thus, the screw cover 68 slides along the screw 64 as the latter is rotated.

An annular front support rod holder 74 is supported rotatably and not movably in the axial direction in the vicinity of a foreward end of the screw cover 68. An annular rear support rod holder 76 having a central opening 76b is supported rotatably and not movably in the axial direction on the reduced diameter portion 64c of the screw 64. A drive unit 78 for driving and rotating the front support rod holder 74 is connected to the front support rod holder 74. The drive unit 78 can rotate the front support rod holder 74 with a rotation speed necessary for realizing a desired width of the wedge wire slit. The rear support rod holder 76 is driven by the rotation of the front support rod holder 74. The rear support rod holder 76 has a smaller diameter than the central opening 67a formed in a welder support table 67 and can slide in the central opening 67a. Since the diameter of the large diameter portion 64b is larger than the diameter of the central opening 76b of the rear support rod holder 76, the movement of the rear support rod holder 76 in the advancing direction is prevented by abutting engagement of a front surface 76a of the holder 76 with the step portion 64b of the screw 64. The rear support rod holder 76 is rotated by rotation of the front support rod holder 74.

A wedge wire supply drum 80 storing wedge wire is disposed behind the welder support table 67. A disk-like pressure roll 82 which is disposed in parallel to the screw cover at a predetermined interval from the outer periphery of the screw cover 68 for pressing the wedge wire wound on the support rods to the support rods. The pressure roll 82 is rotated as the screen cylinder 2 is rotated.

Figure 9A:
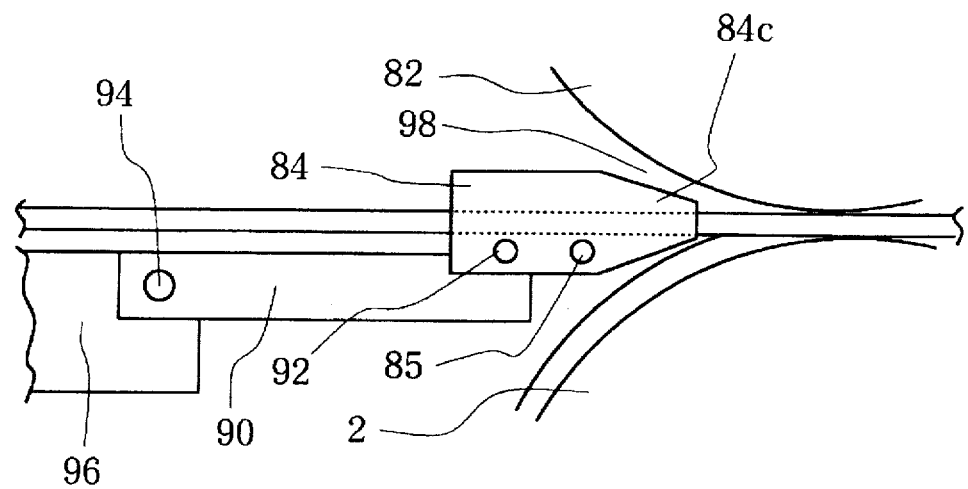
FIGS. 9A and 9B are views showing a part of the device of FIG. 8A in an enlarged scale.
Figure 9B:
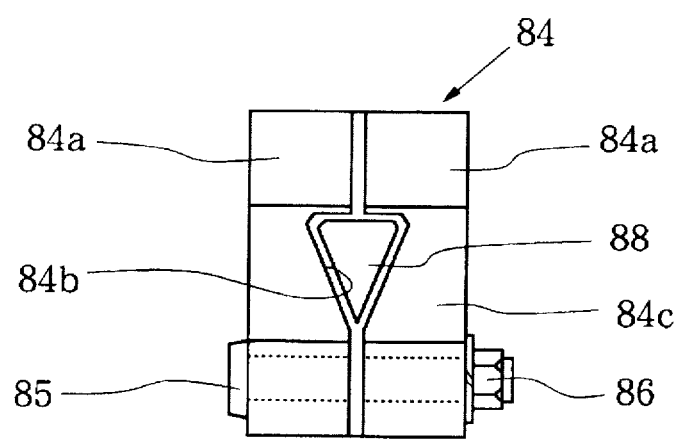
Figure 10:
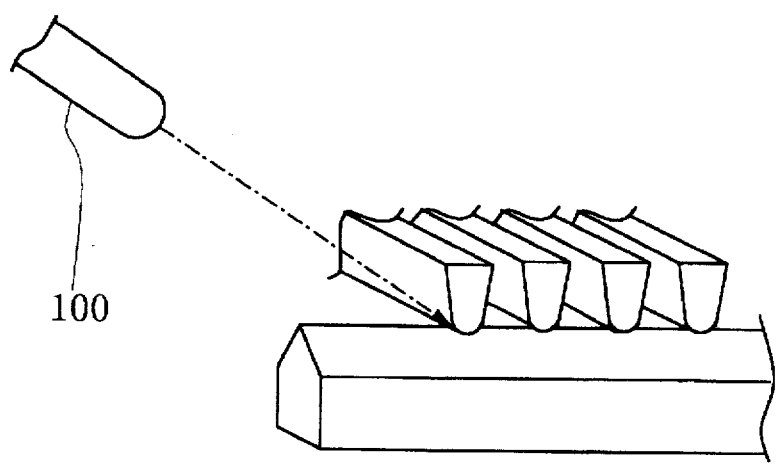
FIG. 10 is a view showing a part of the device of FIG. 8A in an enlarged scale.

A wedge wire holder 84 is provided at a location immediately before the wedge wire is wound on the support rods. This wedge wire holder 84 consists of holder portions 84a and 84b for enabling the wedge wire to pass through them as shown in FIGS. 9A and 9B. After passing the wedge wire, these holder portions 84a and 84b are fixed together by means of bolts 85 and nuts 86. The wedge wire holder 84 has a wedge wire insertion opening 84b having a size slightly larger than the cross section of the wedge wire and has a configuration similar to the cross section of the wedge wire and has a foremost end portion 84c having a configuration similar to a bird's bill. The holder 84 is fixed to a rod 90 by means of a bolt 92 and this rod 90 is mounted on a frame 96 pivotably in the vertical direction and unmovably in the horizontal direction. By inserting the bill-like foremost end portion 84c deeply in a gap 98 between the screen cylinder 2 to be formed and the pressure roll 82, accurate positioning of the wedge wire 88 can be realized.

A laser welder 100 of a known construction is disposed at a location immediately after the wedge wire is wound on the support rods.

Manufacturing of the screen cylinder is performed in the following manner:

(a) The above described apparatus is prepared.

(b) The support rods 102 having a projection in a radially outward end portion are placed circumferentially generally in cylindrical configuration between the front support rod holder 74 and the rear support rod holder 76 and the end portions of the support rods 102 are held by the front and rear support rod holders 74 and 76.

(c) The cylindrically arranged support rods 102 are fed in the advancing direction (in the direction of arrow E in FIG. 8A) by rotating the screw 64 and simultaneously the wedge wire 88 is fed from the wedge wire supply drum 80 and wound on the cylindrically arranged support rods 102 through the wedge wire holder 84.

(d) The wedge wire 88 is welded by the laser welder 100 at its inner apex to the projections of the support rods 102 at each crossing section.

(e) Upon completion of winding and welding of the wedge wire 88, the front and rear support rod holders 74 and 76 are released and a completed screen drum is taken out of the manufacturing apparatus 50.

In the example of FIG. 2, the screen section 4 is arranged in such a manner that major axes of the slits are inclined by 30 to 42 degrees, preferably 37 degrees, with respect to a plane perpendicular to the axis of the screen basket 3.

It is known in hydrodynamics that an inclination angle of a screw blade at which a screw blade of a rotating screw does not come into contact with the same portion of rotating water under centrifugal force again, i.e., an inclination angle of a screw blade at which resistance of water is at the minimal and therefore the maximum propulsion of the screw can be obtained, is 37 degrees. In the example of FIG. 2, by setting the inclination angle of the slit 12 at an angle within the range between 30 to 42 degrees, i.e., a range which is in the vicinity of 37 degrees on the basis of this hydrodynamics theory, resistance of the screen section 4 to water rotating under centrifugal force is held at the minimal whereby the highest speed of rotation of the screen basket 3 is realized and the maximum flow speed of water passing through the slit 12 due to the centrifugal force is attained. By this arrangement, water collides against the inner wall of the casing 2 at the maximum force and, therefore, fractionization of particles of water can be realized most effectively.

Further, setting of the inclination angle of the slit 12 in the above described manner brings about the advantageous result that slurry or other solids attached to the screen surface of the screen section 4 is carried upwardly along the inclined slit 12 and is removed easily out of the screen basket 3.

The speed of rotation of the screen basket 3 is set at a value within 900 rpm and 5,000 rpm at which water to be treated is let out of the slit 12 and collides against the inner wall of the casing 2 at a speed which is sufficiently high to fractionize particles of water.

In this embodiment, the wedge wires 10 of the screen section 4 are made of a magnetic substance. A metal particle in water to be treated having a diameter which is smaller than the slit width is caught by the screen section 4 and is removed from water to be treated and carried outside with slurry.

An operation of this centrifugal water treatment device 1 will now be described.

By actuating the drive unit 5, the screen basket 3 is rotated counterclockwise in the casing 2. In the meanwhile, water to be treated is introduced from the water source 7 to the open end portion 6b of the water supply section 6 through the conduit 8 and supplied from the water outlet 6a to the inside of the screen basket 3. The water supply section 6 is rotating with the screen basket 3 and water is rotated in the screen basket 3 and is let out of the slits 12 of the screen section 4 radially outwardly due to centrifugal force. Water collides against the inner wall of the casing 2 and falls to the bottom of the casing 2 and is collected from the outlet 2c. In the process of passing through the extremely fine slit 12 at a high speed, particles of water to be treated are fractionized and, moreover, in the course of colliding against the inner wall of the casing 2, the particles of water are further fractionized with resulting activation of water.

In the meanwhile, solids contained in the water to be treated are carried upwardly along the wires 10 which are inclined by 30 to 42 degrees to the upper peripheral portion 3f and then fall from the perpendicular portion 3g into a solid receiving pan (not shown) provided outside of the casing 2 to be collected as slurry.

FIG. 4 shows another example of the screen basket 3. In FIG. 4 and subsequent figures showing other examples of the screen basket, the same component parts as those of the screen basket of FIG. 2 are designated by the same reference characters and description thereof will be omitted.

The screen basket 3 of FIG. 4 has, in addition to the structure of the screen basket 3 of FIG. 2, blades 13 in the form of plates welded to the inside surface of the screen section 4. As shown in FIG. 4, major axes of the blades 13 are inclined by 30 to 42 degrees with respect to a plane perpendicular to the axis of the screen basket 3. It is desirable that these blades 13 be provided in several stages vertically and in a diametrically opposed pair circumferentially or three blades disposed circumferentially at equal interval. The provision of the blades 13 is advantageous in that these blades 13 increase the centrifugal force acting on the water flow while retaining resistance of the screen section 4 to the rotating water at the minimum and thereby increase the speed of water passing through the slits 12. The blades 13 function also to enhance upward carrying of solids.

FIG. 5 shows another example of the screen basket 3. This screen basket 3 is the same as the screen baskets 3 shown in FIGS. 2 and 4 in that the screen plates 9 are inclined by 30 to 42 degrees with respect to the plane perpendicular to the axis of the screen basket 3. In this screen basket 3, however, the direction of wedge wires 10 is perpendicular to the longitudinal direction of the screen plate 9 as shown in the portion enclosed by circle C and, accordingly, the screen portion 4 is arranged in such a manner that the slits 12 crosses the inclination angle of 30 to 42 degrees with respect to the plane perpendicular to the axis of the screen basket 3.

By this arrangement, the slits 12 cross the direction of water stream and resistance of the slits 12 to the water stream is made maximum. As a result, water to be treated tends to be forced out of the slits 12 and separation of water from the screen basket 3 is enhanced though speed of the water stream decreases. Accordingly, in this example, more water can be treated per unit time than the examples of FIGS. 2 and 4 and, therefore, is more suited for use in a case where more weight is placed upon necessity for increasing water treatment efficiency than necessity for increasing the speed of water stream.

FIG. 6 shows another example of the screen basket 3. In this screen basket 3, as different from the examples of FIGS. 2, 4 and 5, screen plates 9 are disposed vertically with the direction of wedge wires 10 of the screen plates 9 coinciding with the longitudinal direction of the screen plates 9. Therefore, as shown in the portion enclosed by circle D, slits 12 extend from the upper end portion 3d to the lower end portion 3e along the peripheral wall. Further, in this example, as shown in FIGS. 7B and 7C, a projecting portion 10b of each wedge wire 10 on the upstream side projects in water stream flowing in the direction of arrow F by 3 to 10 degrees from a plane 20 shown in FIG. 7A on which the inside surfaces of the wires 10 are usually aligned. By this arrangement, resistance of the slits 12 to water is increased and separation of water from the screen basket 3 is enhanced. Therefore, the example of FIG. 6 is suited, as the example of FIG. 4, for a case where more weight is placed on necessity for increasing water treatment efficiency than on necessity for increasing the speed of water stream. If the inclination angle of the wedge wires 10 is less than 3 degrees, significant resistance of the slits 12 to water will not be produced whereas if the inclination angle exceeds 10 degrees, resistance of the slits 12 to water becomes excessively large with resulting difficulty in obtaining a sufficient rotation speed of the screen basket 3.

Figure 11:
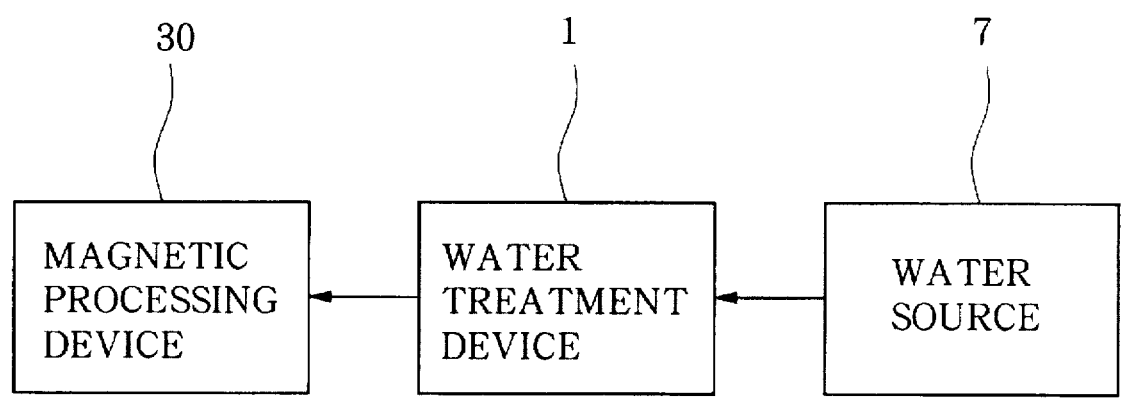
FIG. 11 is a block diagram showing an example of application of the device shown in FIG. 1.

FIG. 11 shows an example of a water treatment system in which the centrifugal water treatment of FIG. 1 is provided in a prior stage to a known magnetic processing device 30. In this water treatment system, the centrifugal water treatment device 1 is provided as a pretreatment unit for activating of water by the magnetic processing device 30 and performs functions of purifying water by separating solids from water and fractionization of particles of water.

In the above described embodiments, the centrifugal water treatment device has been described as a vertical type device. The invention however is not limited to a vertical type device but is applicable also to a horizontal type water treatment device.

The frust-conical type screen basket has been described as the most preferable shape. The screen basket however is not limited to this shape but screen baskets of other shapes such as a cylindrical shape may be employed.

In the above described embodiments, the wedge wires of the screen section are made of a magnetic substance. The entire screen section or a part thereof may be made of a magnetic substance. Alternatively, the screen section may be made of a non-magnetic substance.

What is claimed is:

1. A water treatment device comprising a casing having an outlet for treated water;

a frustoconical shaped screen basket having a central axis of rotation, a peripheral wall portion and a closed end portion which is received in the casing;

a screen section provided in said peripheral wall portion of said screen basket;

a drive unit for rotating said screen basket about said central axis of rotation; and a water supply section provided at said central axis of rotation in said screen basket which is connected to a separate source of water to be treated;

said screen section of said screen basket comprising an inner portion which is radially spaced around said water supply section, said inner portion having support rods having projecting portions in said inner portion which are radially outwardly spaced from said water supply section and including wires of a substantially triangular cross section provided radially inwardly of said support rods and extending in a direction crossing said support rods, each of said wires having a substantially triangular cross section being arranged with a first side which forms an inward portion of said screen and a second and third sides forming respective slits with adjacent triangular shaped wires which widen radially outwardly between adjacent wires in a direction which is opposite said first side and with the apex of each of said wires of a substantially triangular cross section being welded to the projecting portion of said support rods at crossing points of said wires of a substantially triangular cross section and said support rods, and the width of said slits of the wires being from 1 µm to 100 µm wherein said screen section is arranged in such a manner that said slits have major axes which are inclined by 30 to 42 degrees with respect to a plane perpendicular to said central axis of the screen basket.

2. A device as defined in claim 1 wherein the device further comprises blades in the form of plates secured fixedly to the inside surface of said screen section, said blades having major axes which are inclined by 30 to 42 degrees with respect to a plane perpendicular to said central axis of said screen basket.

* * * * *